Feb. 4, 1936.  B. E. LUBOSHEZ  2,029,703
CINEMATOGRAPH APPARATUS
Original Filed Aug. 14, 1933  2 Sheets-Sheet 1
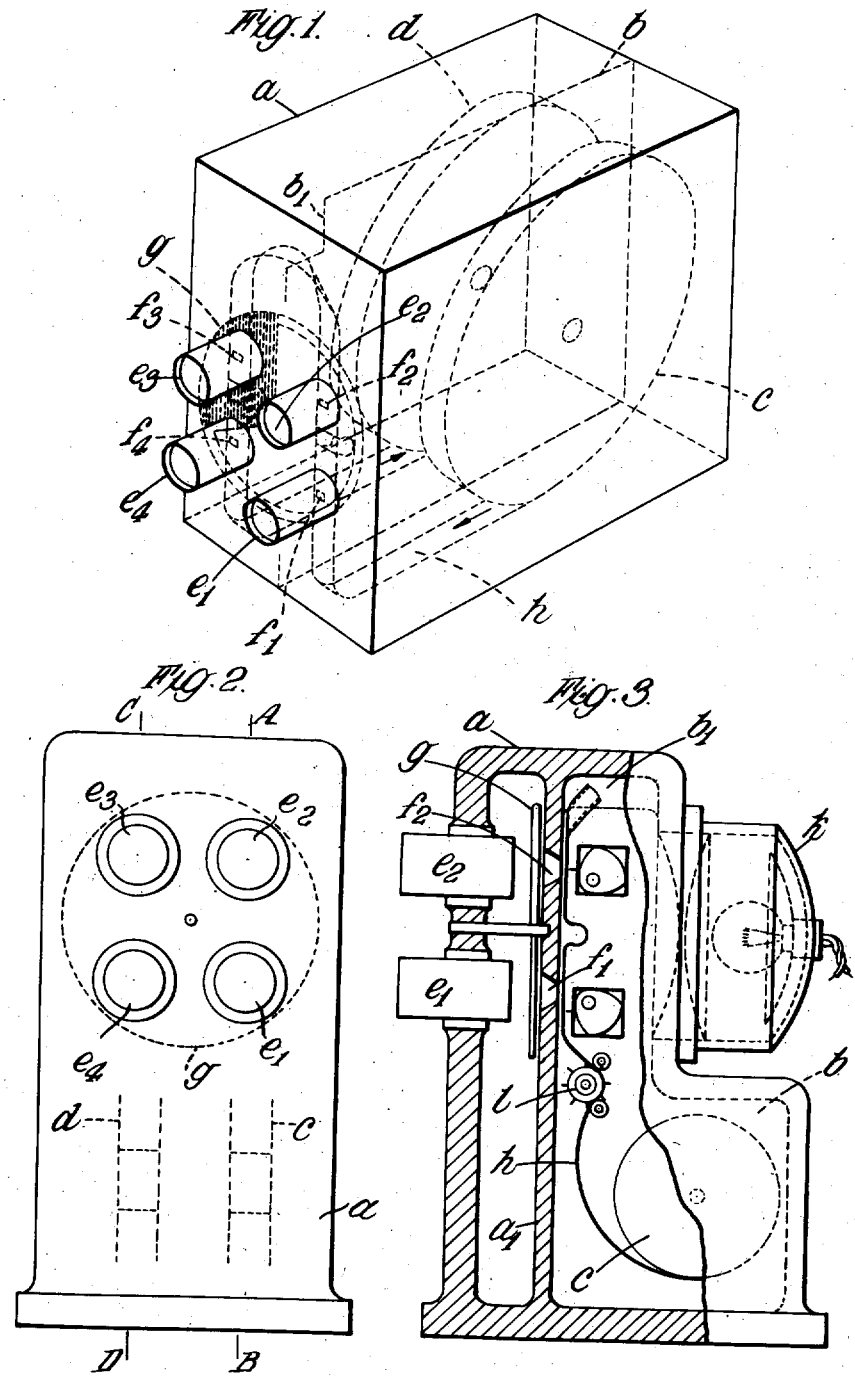
B. E. LUBOSHEZ.
BY Fetherstonhaugh & Tansley Feb. 4, 1936. B. E. LUBOSHEZ 2,029,703
CINEMATOGRAPH APPARATUS
Original Filed Aug. 14, 1933   2 Sheets-Sheet 2
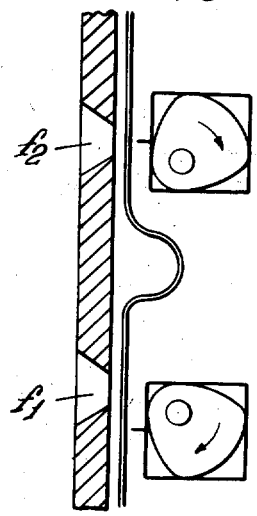
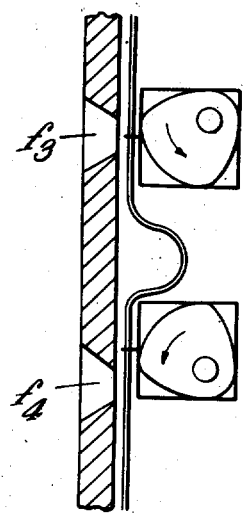
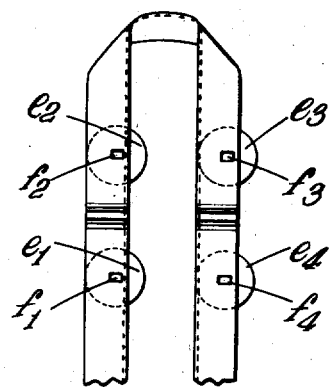
B.E. Luboshez Patented Feb. 4, 1936

2,029,703

UNITED STATES PATENT OFFICE 2,029,703

CINEMATOGRAPH APPARATUS

Benjamin Ellan Luboshez, Harrow, England

Application August 14, 1933, Serial No. 685,120. Renewed August 14, 1935. In Great Britain August 16, 1932

3 Claims. (Cl. 88—16.6)

The present invention relates to cinematograph apparatus of the kind where several series of exposures are made through separate lenses in turn and subsequently projected in the same order whereby the whole time available is used for exposure and a projected image is always on the screen without any dark intervals. Where several lenses are employed, it is further possible to provide for overlapping exposures and an example of this kind is illustrated in my prior patent application No. 540,119 filed May 26, 1931, now Patent No. 1,923,987.

The present invention lies in an improved construction and arrangement of apparatus employing four lenses in ring formation situated preferably at the corners of a square or rectangle, a single rotating shutter for all the lenses being employed and arranged as in my above said prior specification. In the present invention a continuous length of film is fed from a supply spool to a take-up spool as in known apparatus, i. e. the present apparatus does not employ an endless band as described in my above said prior specification. One of the objects of the present invention is to enable the prismatic redirection of the rays radially to be dispensed with. According to this invention the film on leaving one spool is passed in a straight line along a track past two of the lenses in line situate at adjacent corners of the rectangle with a loop between the lenses and is then turned through substantially 180° and passed in a similar manner past the other two lenses at the remaining adjacent corners of the rectangle, then on to the take-up spool.

In the accompanying drawings, Fig. 1 is an isometric transparent diagram showing the relative location of the essential parts of a cinematograph camera in accordance with the invention, Fig. 2 is a diagrammatic front elevation of a camera showing the preferred relative location of the parts, Fig. 3 is a vertical section partly in elevation on the line A—B of Fig. 2; Fig. 4a is an enlarged detail section on part of the line A—B of Fig. 2, and Fig. 4b is a similar view on the line C—D, showing details of the mechanism in their relative positions at one particular instant; and Fig. 5 is an elevation of the film showing its relation to the gates.

In Fig. 1, which is purely diagrammatic to illustrate the course of the film as set out above, a cinematographic camera is indicated by the box $a$ having a central vertical partition $b$ dividing the interior into two compartments, one of which contains the film delivery spool $c$ and the other the film take-up spool $d$. On the front of the camera are located four lenses $e_1$—$e_4$ associated respectively with film gates $f_1$—$f_4$. Between the lenses and the gates is located a rotary sector shutter $g$ which, on rotating, exposes the film at each gate in turn. It will be understood that any aperture may be given to the shutter as described in my above mentioned patent specification for the purpose of varying exposure time. The film $h$ on leaving the supply spool $c$ is passed in a straight line through the gates $f_1$ and $f_2$ with a loop between these gates, then through an aperture $b_1$ in the partition $b$, turning through 180°, and then in a straight line through the gates $f_3$ and $f_4$ with a loop between, finally on to the take-up spool $d$. If the shutter shown in Fig. 1 rotates anti-clockwise, the film would be moved through the gate $f_1$ whilst the sector part of the shutter closes the lens $e_1$ and then in turn will be moved at the gates $f_2$, $f_3$ and $f_4$ whilst the shutter closes the respective lenses $e_2$, $e_3$ and $e_4$, the film exposing at three of the gates whilst it is moved through the remaining gate.

Since, in turning through 180° and passing through the aperture $b_1$ the same face of the film must be directed towards the lenses, this turn will be best understood if it is imagined that the film is flexible edgeways. The turn could then be undertaken without twisting. Actually, however, two partial twists will be incurred.

With film moving apparatus capable of moving the film four picture spaces at a time through each gate, it will be possible to arrange the whole of the four series of exposures thus produced in one single line along the film. On the other hand, four rows of pictures across the width of the film could be arranged, in which case the normal one space movement at a time through each gate will be used. The preferred form, however, consists of a means, whereby there are two rows of pictures across the width of the film and the film is moved two picture spaces at a time through each gate. With this arrangement, as will be explained hereafter, no correction is necessary for shrinkage between exposure and projection when the same apparatus is used for both purposes. Location of the images on the film in this manner is shown in Fig. 5.

To enable the apparatus to be used as both camera and projector, the preferred arrangement is as shown in Figs. 2 and 3 where the film spools $c$ and $d$ are located below the lenses in order to permit the use of a projector lamp housing $k$ behind the film gates. The part section Fig. 3 shows a vertical partition $a_1$ to carry the film gates located to the rear of the shutter $g$. The usual film sprocket $l$ is also shown. The film operating mechanism is shown in Figs. 4a and 4b which must be considered in conjunction with Fig. 3. In these, the operation device is of the type described in my co-pending application No. 653,034 filed January 21, 1933 now Patent No. 1,936,141. At the instant illustrated, the film has just completed its movement at the gate $f_3$ and the claw is about to leave the perforation on the centre line of the image, whilst the film is just about to be moved through the gate $f_4$, the claw having just entered the perforation. Since the next succeeding gate through which the film must be moved is $f_1$, the film claw for this gate will move perpendicularly to the film into position, whilst movement of the film is taking place through gate $f_4$. The film claw shown is just about to commence this movement towards the film. Likewise at gate $f_2$ the film claw has just completed its receding movement and is about to commence the return stroke.

If, with the above described arrangement, the film claws leave the perforations exactly on the horizontal centre lines of the images, no correction for longitudinal shrinkage will be necessary. Neither will any correction be necessary if all the claws leave at a constant distance above or below the centre lines, for the effect would be only a slight displacement of all the images on the screen, whilst they may remain in register. This, however, will necessitate separate sets of perforations for each of the two aligned pairs of gates, unless the perforations are precisely midway between the image centre lines. This could be provided for by perforations along both edges of the film. If perforations along one edge only are employed and situated at a constant distance from the image centre line which is not midway between two centre lines, then the effect will be that the claws leave the perforations at gates $f_1$ and $f_2$ a constant distance above the centre lines, and at gates $f_3$ and $f_4$ a constant distance below, or vice versa. Even in this case registration can be effected by a slight shift of the projection screen one way or the other.

Since the claws must leave the film of necessity at some distance from the side of the vertical centre line, lateral shrinkage of the film must be considered. It will be seen, however, that if the film is kept up to the left or right of all the gates, the effect of shrinkage will only be a slight displacement of the images all in the same direction and to the same amount, hence no correction for the shrinkage will be necessary. If, on the other hand, the film is kept up against the right of one pair of gates and the left of the other pair, the slight displacement of the images in opposite directions can be compensated for as before by a slight shift of the projection screen towards or away from the apparatus.

The above described arrangement of apparatus where displacement of the image due to shrinkage occurs all in the same direction at all the gates, enables adjustment for shrinkage to be made quite easily when employing separate apparatus for exposure and projection. For this purpose, a slight lateral and horizontal adjustment of three of the lenses is all that is necessary.

What I claim as my invention and desire to secure by Letters Patent is:—

1. Cinematograph apparatus comprising in combination a casing, four lenses with substantially parallel axes lying substantially at the corners of a rectangle on one wall of said casing, a rotary sector shutter associated with the said lenses and adapted for covering and uncovering the lenses in succession, an aligned film track associated with two of the lenses at adjacent corners of the said rectangle, another aligned film track associated with the other two lenses, means for passing the film along one of said tracks, turning the film through substantially 180° and then along the other of said tracks, and film operating mechanism for moving in succession that part of the film associated with each lens.

2. Cinematograph apparatus comprising in combination a casing, four lenses with substantially parallel axes lying substantially at the corners of a rectangle on one wall of said casing, a rotary sector shutter associated with the said lenses and adapted for covering and uncovering the lenses in succession, an aligned film track adapted for taking a film two pictures wide and so associated with two of the lenses at adjacent corners of the said rectangle that the pictures produced thereby lie in line along one lengthways half of the film, a similar film track so associated with the other two lenses that the images produced thereby lie in line on the other lengthways half of the film, means for passing the film along one of said tracks, turning the film through substantially 180° and then along the other of said tracks, and film operating mechanism for moving in succession two picture spaces at a time that part of the film associated with each lens.

3. Cinematograph apparatus comprising, in combination, a casing, a longitudinal division dividing said casing into two compartments, four lenses with substantially parallel axes lying substantially at the corners of a rectangle, two lenses being situated on an end wall of each of said compartments, a rotary sector shutter associated with the said lenses adapted for covering and uncovering the lenses in succession, an aligned film track in each compartment associated with the two lenses on the end wall of that compartment, a film supply spool situated in one compartment and a film take-up spool situated in the other compartment, means for leading the film from the supply spool along the track in the supply spool compartment, through an aperture in the partition, turning through substantially 180°, then along the track in the other compartment and to the take-up spool, and film operating mechanism for moving in succession that part of the film associated with each lens.

BENJAMIN ELLAN LUBOSHEZ.